(12) United States Patent
Aronov

(10) Patent No.: US 8,400,308 B2
(45) Date of Patent: Mar. 19, 2013

(54) SYSTEM AND METHOD FOR IDENTIFYING OBJECT AND RELEASING ITS SECURITY

(76) Inventor: Oleg Aronov, Rego Park, NY (US)

( * ) Notice: Subject to any disclaimer, the term of this patent is extended or adjusted under 35 U.S.C. 154(b) by 374 days.

(21) Appl. No.: 12/799,793

(22) Filed: Apr. 30, 2010

(65) Prior Publication Data

US 2011/0267193 A1 Nov. 3, 2011

(51) Int. Cl.
*G08B 13/14* (2006.01)

(52) U.S. Cl. .................. 340/572.9; 340/568.1; 340/571; 340/572.1; 340/572.8; 235/487; 235/493; 235/494; 235/385; 705/22; 705/28; D10/106.9; D10/106.91; D10/106.92

(58) Field of Classification Search ............... 340/568.1, 340/571, 572.1, 572.8, 572.9; 235/487, 493, 235/494, 385; 705/22, 28; D10/106.9, 106.91, D10/106.92
See application file for complete search history.

(56) References Cited

U.S. PATENT DOCUMENTS

| | | | | |
|---|---|---|---|---|
| 5,347,262 A * | 9/1994 | Thurmond et al. | ......... | 340/572.9 |
| 7,441,424 B2 * | 10/2008 | Saitoh et al. | ...................... | 70/19 |
| 2005/0104733 A1 * | 5/2005 | Campero | ................... | 340/572.9 |
| 2007/0188333 A1 * | 8/2007 | Clancy et al. | .............. | 340/572.9 |
| 2007/0262865 A1 * | 11/2007 | Copeland et al. | .......... | 340/572.7 |
| 2008/0084313 A1 * | 4/2008 | Seidel | ......................... | 340/572.9 |
| 2008/0291029 A1 * | 11/2008 | Skjellerup et al. | ......... | 340/572.9 |
| 2008/0303675 A1 * | 12/2008 | Hogan et al. | ............... | 340/572.8 |
| 2009/0033497 A1 * | 2/2009 | Wyatt et al. | ................ | 340/572.1 |
| 2009/0273475 A1 * | 11/2009 | Seidel | ........................ | 340/572.9 |

* cited by examiner

*Primary Examiner* — Jennifer Mehmood
*Assistant Examiner* — Andrew Bee
(74) *Attorney, Agent, or Firm* — Henry M. Feiereisen, LLC

(57) ABSTRACT

For identifying an object and releasing a security of the object an identification element is associated with the object and recognized by recognizing unit, a securing element is attached to an object and releasable from the object, and the identification element and the securing element are formed so that a release of the securing element is possible only after the identification of the object by recognizing the identification element.

8 Claims, 2 Drawing Sheets

SYSTEM AND METHOD FOR IDENTIFYING OBJECT AND RELEASING ITS SECURITY

BACKGROUND OF THE INVENTION

The present invention relates to system and methods for identifying objects and releasing their security.

It is known to provide objects with identifications, for example a barcode, so that the barcode can be scanned on the objects to be identified correspondingly in stores, warehouses, etc.

Also, the objects are provided with securing features formed usually as locks which lock a part of the object, and can be then released from the object to be taken by a user, such as a buyer, etc.

The disadvantage of the existing systems and methods includes the fact that some objects can be easily taken from a store, a warehouse, and the like unlawfully.

In particular, the identification elements, such as barcodes, can be removed from one object which is inexpensive and put on another which is expensive, so that the user then can pay a lower price for the more expensive object. Also, when a user, for example in a store, selects a plurality of objects and brings it to a cashier, just due to a human factor the cashier can scan only some of the objects, and leave other objects unscanned. Then he/she will release the securing devices from all the objects, thus allowing a buyer to take the objects which were not scanned as well and therefore not paid for.

It is believed to be advisable to improve the existing systems and methods for identification and release of objects to users in corresponding entities.

SUMMARY OF THE INVENTION

Accordingly, it is an object of the present invention to provide a system and a method for identifying an object and releasing its security, which is a further improvement of the existing systems and methods.

In keeping with these methods and with others which will become apparent hereinafter, one feature of the present invention resides, briefly stated, in a system for identifying an object and releasing a security of the object to allow the object to be taken by a user, comprising an identification element associated with the object and recognizable by recognizing means, a securing element attachable to an object and releasable from the object, wherein said identification element and said securing element are formed so that a release of the securing element is possible only after the identification of the object by recognizing said identification element.

Another feature of the present invention resides in that said identification element is arranged at least on a part of said securing element.

A further feature of the present invention resides in that said identification element and said securing element are formed so that after the recognizing the identification element by said recognizing means said recognizing means mechanically activates said securing element to release said securing element.

A further feature of the present invention resides in that said identification element and said securing element are formed so that after the recognizing the identification element by said recognizing means said recognizing means electronically activates said securing element to release said securing element.

Still another feature of the present invention resides in a method for identifying an object and releasing a security of the object, comprising the steps of recognizing an identification element associated with the object by recognizing means, releasing a securing element attachable to an object, and forming said identification element and said securing element so that a release of the securing element is possible only after the identification of the object by recognizing said identification element.

A further feature of the method of the present invention resides in arranging an identification element at least on a part of said securing element.

A further feature of the present invention resides in forming said identification element and said securing element so that after the recognizing the identification element by said recognizing means said recognizing means mechanically activates said securing element to release said securing element.

A further feature of the present invention resides in forming said identification element and said securing element so that after the recognizing the identification element by said recognizing means said recognizing means electronically activates said securing element to release said securing element.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

In accordance with the present invention a system and a method for identifying an object and releasing a security of the object are provided.

In the present invention an identification element associated with an object is recognizable, for example scannable by a scanning means, and a securing element attachable to an object is released from an object, so that a release of the scanning element is possible only after the identification of the object by recognizing the identification element.

Figure 1:
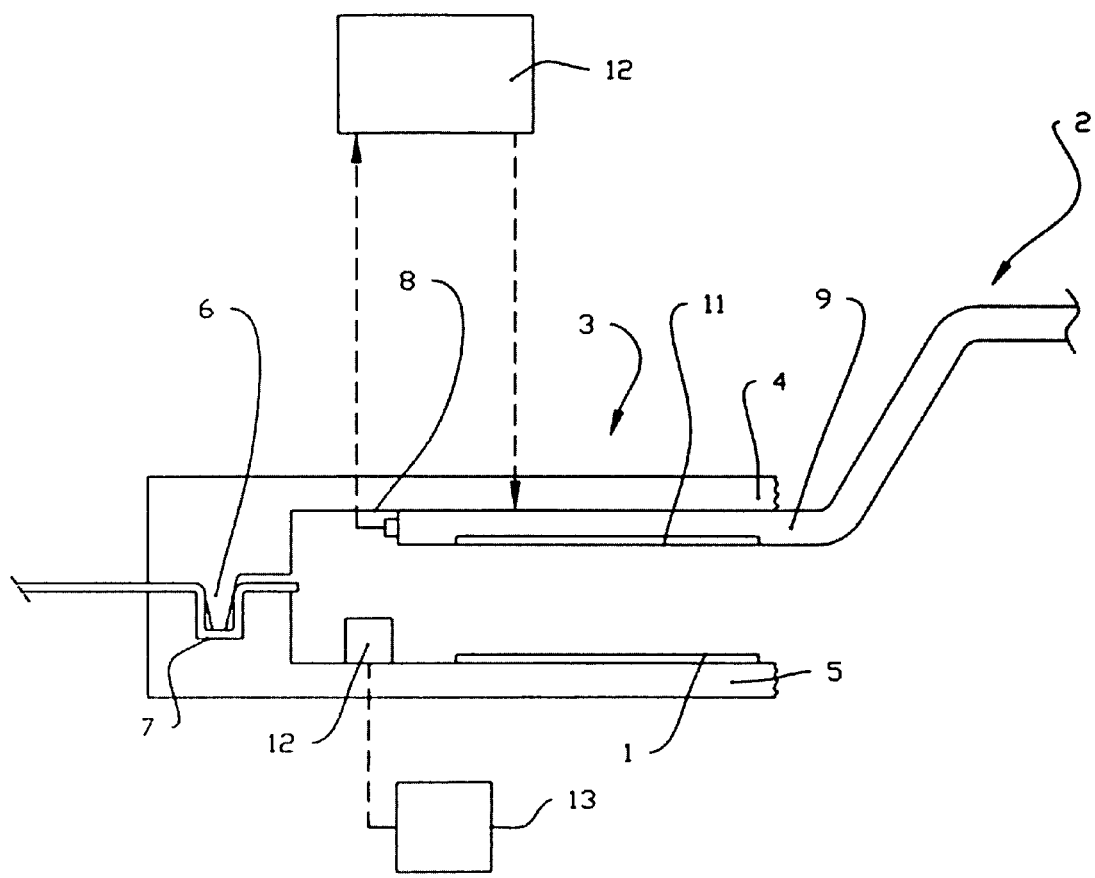
FIGS. 1 and 2 are a side view and a front view of a system for identifying an object and releasing a security of the object in accordance with one embodiment of the present invention.
Figure 2:
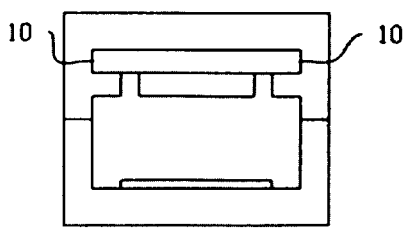

With respect to the drawings, FIGS. 1 and 2 show a system for identification of an object and releasing a security of the object in accordance with first embodiment of the present invention.

The inventive system has an identification element which is identified with reference numeral 1. The identification element can be formed as a known barcode element which is recognizable, for example scannable by scanning means or device identified as a whole with reference numeral 2. The barcode 1 and the scanning device 2 are well known in the art and do not need any additional explanations.

The system further has a securing element which is identified as a whole with reference numeral 3 and includes, for example two parts 4 and 5. The part 4 of the securing element 3 has for example a projection 6, while the part 5 of the securing element 3 has for example a recess 7 in which the projection 6 is engageable with elastic or springy action. An object, for example an article of clothing, is inserted in a space between the projection 6 and the recess 7, and when the parts 4 and 5 are connected with one another by engaging the projection 6 into recess 7, is reliably held in the securing element 3.

The scanning device 2 is provided with a contact sensor 8. The scanning device 2 also has a front part 9 which is guided in grooves 10 of the part 4 of the securing element 3. The scanning device 2 further has a scanning element 11 which is known per se.

The system for identifying an object and releasing a security of the object in accordance with the present invention shown in FIGS. 1 and 2 operates in the following manner.

The scanning device 2, and in particular its part 9 slides in the grooves 10 of the part 4 of the securing element 3 in a direction identified with reference A. When the contact sensor 8 is brought in contact with the transverse inner wall of the part 4 of the securing element 3, it sends a signal to a control unit 12 and the control unit 12 activates the scanning element 11 which scans the barcode 1. After this, the scanning device 2 and in particular its portion 9 is pushed further in direction of the arrow A, and the applied pressure displaces the upper part 4 relative to the lower part 5 of the locking device 3 and disengages the elastic projection 6 the part 4 of the securing element 3 from the recess 7 of the part 5 of the securing element 3, so that the object 12 can be removed from the securing element 3.

It is clear that the release of the securing element 3, and the removal of the object from or vice versa can be performed only after scanning of the barcode 1. Also, it can be seen that the barcode 1 is incorporated: non-removably in the part 5 of the securing element 3, so that the barcode 11 can not be removed and placed on another object without release of the security element.

Means are also provided for preventing unauthorized release of the security element 3. A distance sensor 12 is arranged on one part 5 of the security element. In the event of an unauthorized displacement of the parts 4 and 5 away from one another exceeding a threshold distance, the distance sensor 12 sends a signal to an alarm 13, which is immediately activated.

Also, the security element 3 can be composed of metal, to that it can be tampered with, destroyed or damage by tools by unauthorized persons.

In the embodiment of FIGS. 1 and 2 the release of the securing element 3 from the object is performed by mechanical action (pressure) of the scanning device 2 on the securing element 3.

Figure 3:
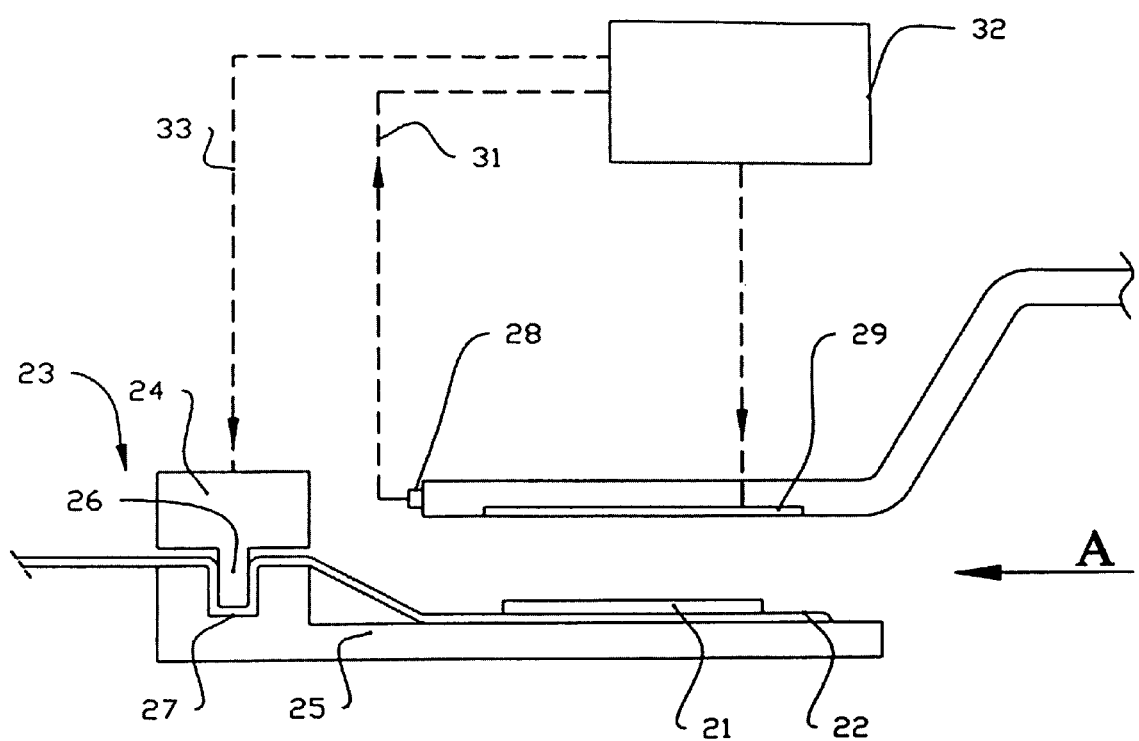
FIG. 3 is a view showing another embodiment of the system for identifying of an object and releasing a security of the object in accordance with the present invention.

FIG. 3 shows another embodiment of the system for identifying an object and releasing a security of the object. In the embodiment shown in FIG. 3, an identification element 21 formed example as a barcode 21 is provided on an object 22. The object 22 passes through a securing device 23 which has parts 24 and 25 provided correspondingly with a projection 26 which engages into a recess 27 so as to clamp the object 22 between the parts 24 and 25.

The securing element 23 is formed as an electromagnetic lock which is known per se. A contact sensor 28 is further provided. Also, as in the embodiment of FIGS. 1 and 2, the barcode 21 can be incorporated non-removably in one of the parts of the securing element 23, for example in the part 26, so that the barcode element 21 and the securing element 23 are of one piece with one another.

The system shown in FIG. 3 operates in the following manner.

A scanning device is moved with its scanning element 29 over the barcode element 21 until the contact sensor 28 is brought in contact with the part 24 of the securing element 23, and in this moment the contact switch 29 sends a signal to a control unit 32 to activate the scanning element 29. The scanning element 29 scans the barcode 21 and sends a signal 31 to the control unit 32 to confirm that the scanning has been completed. When the scanning of the identification element 21 is completed, the control unit 32 sends a signal 33 to the securing element 23 formed as an electromagnetic lock. The parts 24 and 25 of the electromagnetic lock and their projection 26 and recess 27 move apart from one another, thus releasing the object 22.

In this embodiment after scanning of the identification element or barcode 21, the release element 23 is released electronically.

It will be understood that each of the elements described above, or two or more together, may also find a useful application in other types of methods and constructions differing from the type described above.

While the invention has been illustrated and described as embodied in system and method for identifying object and removing its securing, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for identifying an object and releasing a security of the object, comprising a securing element attachable to the object to maintain the security of the object and releasable to allow the object to be taken by a user; an identification element associated with the object and located on said securing element in an interior of said securing element; and a recognizing element for recognizing said identification element, wherein said securing element, said recognizing element and said identification element are formed so that a release of said securing element from the object is possible only when said recognizing element is introduced into the interior of said securing element and identifies said identification element on said securing element inside said securing element.

2. A system as defined in claim 1, wherein said securing element has two parts which are spaced from one another and limit said interior of said securing element, in which interior said identification element is located and into which interior said recognizing element is insertable to identify said identification element inside said securing element.

3. A system as defined in claim 1, wherein said recognizing element is movable between two positions including a first position in which said recognizing element is inserted into said interior of said securing element and identifies said identification element and a second position in which said recognizing element is moved farther into said interior of said securing element after identifying said identification element and acts on said securing element to release said securing element from the object.

4. A system as defined in claim 3, wherein said securing element has two parts provided with interengaging projection and groove between which the object is clamped and which are formed so that when said recognizing element is moved from said first position into said second position said recognizing element disengages said projection and groove so that the object can be released from the securing element.

5. A system as defined in claim 1, wherein said recognizing element is provided with a contact sensor, which upon introduction of said recognizing element into the interior of said securing element and touching said securing element, activates a process of identification of said identification element by said recognizing element.

6. A method of identifying an object and releasing a security of the object, comprising the steps of attaching a securing element to the object to maintain the security of the object and releasing the securing element to allow the object to be taken by a user; associating an identification element with the object and locating the identification element on the object in an interior of the securing element; recognizing the identification element by a recognizing element; and making the release of the securing element from the object only when the recognizing element is introduced into the interior of the securing element and identifies the identification element on the securing element inside the securing element.

7. A method as defined in claim 6, further comprising touching of the securing element by a sensor provided on the recognizing element when the recognizing element is introduced into the interior of the securing element; and activating a process of identification of the identification element by the recognizing element by the contact sensor when the contact sensor touches the securing element.

8. A method as defined in claim 6, further comprising electronically identifying the identification element by the recognizing element and thereafter electronically releasing the securing element by the recognizing element.

* * * * *